Figure 1:
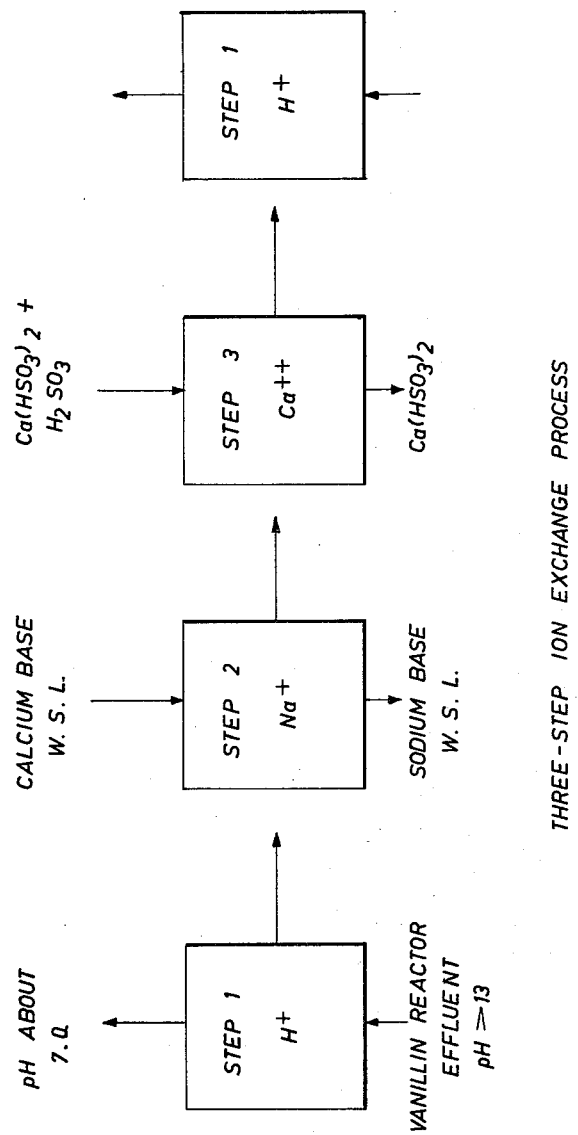

July 27, 1965

C. D. LOGAN 3,197,359

CYCLIC PROCESS FOR RECOVERING VANILLIN AND
SODIUM VALUES FROM LIGNOSULFONIC WASTE
LIQUORS BY ION EXCHANGE

Filed Sept. 5, 1961

2 Sheets-Sheet 1

INVENTOR.
Charles Donald Logan
BY
Attorney

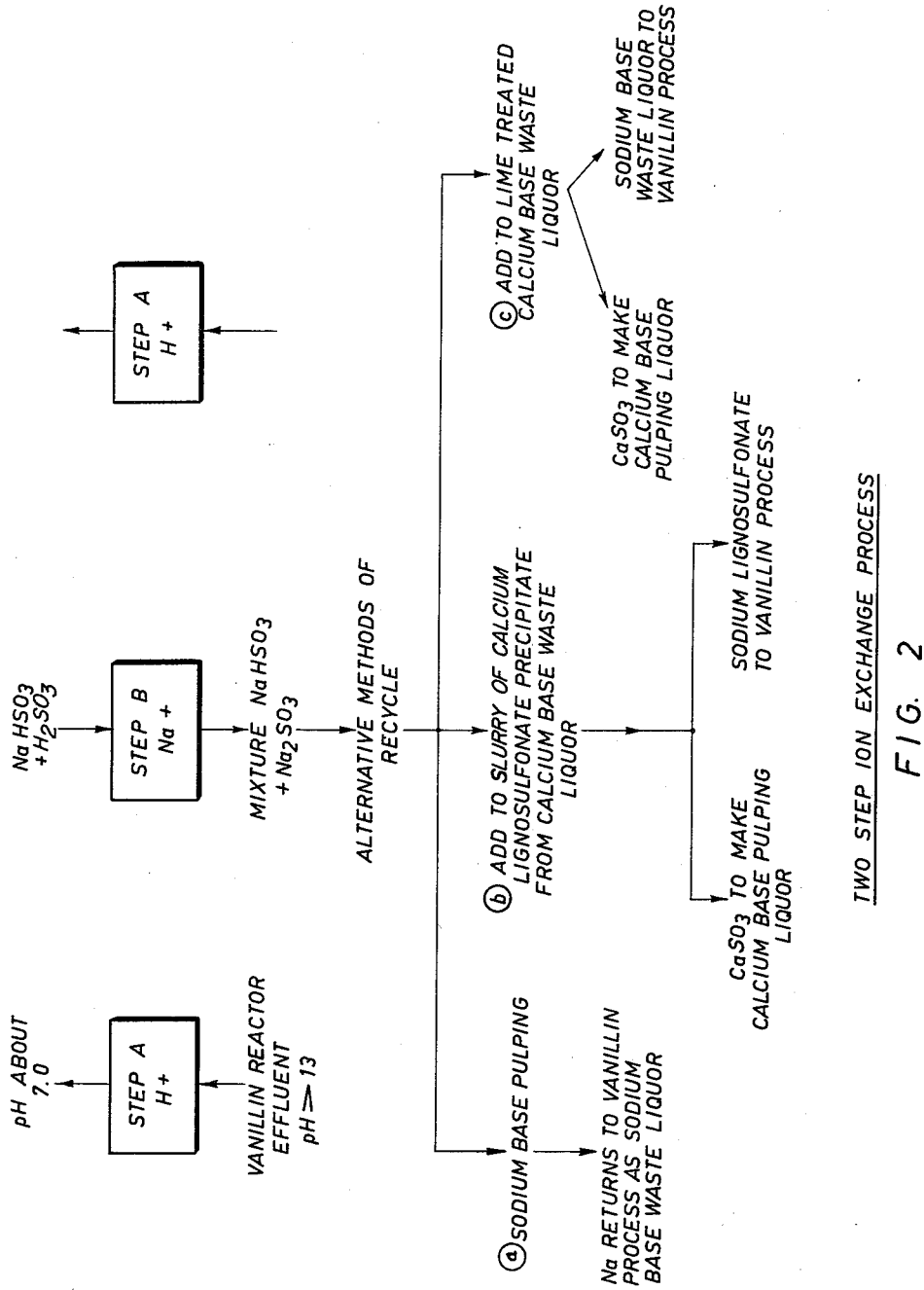

United States Patent Office 3,197,359
Patented July 27, 1965

3,197,359
CYCLIC PROCESS FOR RECOVERING VANILLIN AND SODIUM VALUES FROM LIGNOSULFONIC WASTE LIQUORS BY ION EXCHANGE
Charles Donald Logan, St. Catharines, Ontario, Canada, assignor to The Ontario Paper Company Limited, Thorold, Ontario, Canada
Filed Sept. 5, 1961, Ser. No. 135,938
9 Claims. (Cl. 162—16)

This invention relates to an ion exchange process which permits substantial reduction in chemical requirements when vanillin is formed by the controlled alkaline oxidation of lignosulfonic acid compounds. More specifically, this invention relates to the use of a weakly cationic resin to effect the recovery of sodium values from the liquor containing the same and discharged from a reactor in which vanillin substance has been produced from lignosulfonic acid compounds and, further, to reduce the requirements for acid in the subsequent treatment of such liquor to convert its vanillin content from the form of the sodium derivative of vanillin to free vanillin.

It is well known that vanillin can be made by the controlled oxidation of lignosulfonic acid compounds with or without the use of air and either in the presence of caustic alkali (usually sodium hydroxide) or in the presence of a combination of lime and sodium carbonate. Examples of such processes are given in: U.S. Patent No. 2,069,-185—Hibbert and Tomlinson; U.S. Patent No. 2,099,-014—Hatch; U.S. Patent No. 2,434,626—Salvesen et al.; U.S. Patent No. 2,544,999—Marshall and Sankey; U.S. Patent No. 2,692,291—Bryan; Canadian Patent No. 615,-553—Craig and Logan.

My invention is an improvement applicable to any of the above cited processes for production of vanillin or for other similar vanillin-producing processes characterized by the presence of substantial sodium values in the alkaline liquor discharged from a reactor.

For the successful operation of each of the above-mentioned processes a substantial alkali concentration must be maintained in the reactor. In Craig and Logan Canadian Patent No. 615,553, a minimum pH of 12 is disclosed as essential. In processes where sodium hydroxide is the principal or sole caustic alkali, higher pH's of the order of 13 or above are normal in the liquor discharged from the reactor. Such liquor, hereinafter designated as "vanillin reactor effluent," normally contains some free caustic soda, vanillin in the form of its sodium derivative, and additional sodium values in the form of salts such as carbonate, sulphate, an oxalate, together with the sodium salts or derivative of breakdown products of the lignosulfonic acids, some of which are still of sufficient molecular weight and complexity that they are broadly referred to as "lignin," while others are of a lower molecular weight of the order of magnitude of that of vanillin. Also normally present is an insoluble fraction (chiefly calcium carbonate), together with other products of the vanillin-forming reaction.

The term "lignin" is generally used in a broad sense to include the binding or encrusting material present in the middle lamella and elsewhere in and between the cells of vegetable substance as well as fractions, compounds and moderately high molecular weight derivatives of the same formed and/or separated by many known processes from vegetable substance, the most important of such processes being those for pulping wood substances. For purposes of clarity and convenience I use the term "lignin" herein, unless otherwise specifically stated, to mean any lignin-like material which can be precipitated by acid from a vanillin reactor effluent as hereinbefore defined. The bulk of such lignin comprises partially desulfonated lignosulfonate material.

Separation of vanillin from vanillin reactor effluent requires either acidification of the liquor, e.g., by carbon dioxide and sulphuric acid, a separation of the lignin thereby precipitated and extraction of the vanillin with a suitable solvent, e.g., benzene or toluene or, alternately, extraction of the sodium salt of vanillin from the alkaline vanillin reactor effluent typically with a substantially aqueous alkali-immiscible alcohol. In the later case should it be desired to precipitate and recover the lignin, acidification follows the extraction step.

As examples of such known processes, reference is made to U.S. Patent No. 2,069,185—Hibbert and Tomlinson; U.S. Patent No. 2,104,701—Sandborn; U.S. Patent No. 2,434,626—Salvesen et al.; U.S. Patent No. 2,399,-607—Servis; U.S. Patent No. 2,489,200—Sankey and Marshall, and U.S. Patent No. 2,721,221—Bryan. My invention is directed both to the recovery or reuse of sodium values in vanillin plant effluent and also to a substantial reduction in the acid requirements for the purposes described in the preceding paragraph.

My invention my be effected by either a three-step or a two-step process using a weakly cationic ion exchange resin. In addition, when my invention is applied in a plant producing vanillin from lignosulfonic acid compounds, which plant is located sufficiently near a plant for producing sulphite pulp employing either sodium or calcium as a base for the sulphite pulping operations, it is advantageous to integrate the recovery of sodium values in acordance with my invention with the said pulping operations in a manner hereinafter to be described. In general, the application of my invention involves:

(1) Treatment of a vanillin reactor effluent with an ion exchange resin to effect an exchange of part of the sodium ion concentration in the said effluent with hydrogen ion from the said resin;

(2) Using a three-step process, treating the calcium base lignosulfonate liquor prior to its introduction into a reactor for making vanillin so as to effect an exchange of calcium ions in the said liquor with sodium ions from the said resin;

(3) In a three-step process treatment of the resin from (2) above with sulphurous acid so as to effect an exchange of sulphite acid ion with the calcium ion from the resin or, in a two-step process, to effect an exchange of sulphite acid ion with the sodium ion present from the resin resulting from (1) above, and, optionally, (4) Using calcium bisulphite or sodium bisulphite values obtained from (3) above in the appropriate sulphite pulping operation, or for such other purposes as may be desired.

The ion exchange resins which I have found particularly applicable in my process are those containing carboxylic acid exchange centres, which resins are characterized by high absorption capacity. Amberlite IRC–50 (Rohm & Haas Company) is a particularly suitable resin in that it shows a very high affinity for hydrogen ion and can be quantitatively stripped of sodium ion. In contrast, strongly acid cationic sulfonated resins cannot be readily reconverted to the hydrogen form with sulphite acid ion and are consequently unsatisfactory for the purposes of my invention. As another example of a suitable resin, I have used Duolite C–63 (Chemical Processing Company), the active exchange centres in which are phosphoric acid groups. It is to be understood that any resin which can take up sodium from a sodium hydroxide solution and can also be regenerated to the hydrogen form with either sulphurous acid or a soluble bisulphite may be employed in the practice of my invention and, in the specification, when I refer to a weakly acidic cationic resin, I mean and have reference to such resins.

In general, any form of lignosulfonic acid compound which is suitable as a starting material for the production of vanillin is also suitable as a starting material in the practice of my invention. Examples of such material are: waste sulphite liquor (W.S.L.); W.S.L. steam stripped to remove excess sulphur dioxide; W.S.L. from which residual bisulphite has been removed, e.g., by lime precipitation; W.S.L. after fermentation of the sugar content to produce ethyl alcohol (hereinafter referred to as "alcohol plant effluent"); the residual from W.S.L. which has been used to grow yeast such as *Torula utilis*, or W.S.L. which has been subjected to a prehydrolysis to reduce the sugar content. Another example is a lime precipitated substantially sugar-free calcium lignosulfonate such as described in U.S. Patent Re. 18268, Howard, and U.S. Patent No. 1,856,558, Howard.

My invention may be described by reference to the following process. In this description the lignosulfonate material employed is an alcohol plant effluent from a residual liquor from a calcium base sulphite pulping process and the specific process for preparing vanillin is that described and disclosed in Canadian Patent No. 615,553, Craig and Logan. This process discloses the method of practising my invention and will enable anyone skilled in the art to adopt it to other forms of lignosulfonic acid compounds and to other processes for the production of vanillin characterized by the presence of substantial sodium values in the alkaline liquor discharged from the reactor.

In the accompanying drawings FIG. 1 illustrates diagrammatically the steps in my three-step process and FIG. 2 the steps in my two-step process. In carrying out my process on a three-step basis, I proceed as follows:

*Step 1.*—In this step the vanillin reactor effluent is passed upward through an ion exchange bed of Amberlite IRC-50, said resin being in its acidic form, and during the course of the step exchanging its hydrogen ion for sodium ion from the reactor effluent.

The total exchange capacity of Amberlite IRC-50 is obtainable only at high pH values. The rate of exchange is also accelerated as the temperature is increased up to the maximum temperature at which the resin itself tends to break down, i.e., at a temperature greater than 100° C. I have found that using a vanillin reactor effluent at 75° C., which has a pH of 13 or higher owing to its excess of residual sodium hydroxide (20–30 grams per litre), substantially all the carboxylic groups of the resin corresponding to its maximum exchange capacity can be utilized. The capacity may, however, fall off owing to the hydrogen-sodium exchange as the pH of the liquor drops appreciably on passage through the resin. It is undesirable that the pH be permitted to fall to a value at which lignin precipitation occurs. I have found that it is possible, using the vanillin reactor effluent as stated, for the pH to fall to 7.0 without any lignin precipitation. It must be pointed out, however, that in a three-step ion exchange operation now being described, the actual pH drop in this step is limited by the equivalent calcium which is available in the second step and not by the maximum sodium ion which can be absorbed by the resin without reduction of pH to the point where lignin precipitates.

When employing the residual vanillin liquor such as that resulting from the process described in Canadian Patent No. 615,553, Craig and Logan, the pH of the resin may fall initially below 6.0, especially if the rate of flow through the column is slow. Under these circumstances not only may lignin precipitate, which is undesirable, but carbon dioxide may be evolved which disrupts the resin bed and makes the process difficult or even inoperable. I have discovered that this can be avoided by feeding the vanillin reactor effluent upward through the exchange column at such a rate as to fluidize the bed. In this way, any small evolution of carbon dioxide gas is swept out and, further, the ion exchange bed is reclassified once in each cycle so that it is not necessary to backwash the column as would otherwise be required on occasion in a series of successive cycles. In addition, as the resin changes from the hydrogen to the sodium form the resin volume increases usually from 50% to 100%, depending on the pH conditions. Such a resin expansion is much less critical to proper column operation in a fluidized bed provided by an upward flow through the bed during this first step.

*Step 2.*—In this step calcium base alcohol plant effluent is passed through the ion exchange bed residual from Step 1, the resin being initially in the form of its sodium derivative and, during the course of this step, exchanging its sodium ion for calcium ion from the alcohol plant effluent. The effect of this step is therefore to convert calcium base alcohol plant effluent to an equivalent sodium base alcohol plant effluent thereby reducing the sodium requirements for subsequent vanillin production.

Since Amberlite IRC-50 is characterized by a high affinity for hydrogen ions, the exchange capacity is critically affected by the pH. Above pH 7 substantially all the carboxylic groups participate in the sodium-calcium exchange, while below pH 7 the resin reverts rapidly to the hydrogen form and shows progressively less capacity for cation exchange until at a pH of about 3.5 the resin is primarily in its free acid form and does not exchange with other cations.

Since in the three-step ion exchange process being described the limiting factor for a maximum sodium recycle and, equally for maximum acid saving in subsequent precipitation of lignin, is the calcium content of the feed to the resin bed during this step of the cycle, it will be apparent that a low calcium content and a low pH are both to be avoided. Both of these objectives can be obtained by a pretreatment of the alcohol plant effluent with lime. To give optimum exchange capacity to the resin the alcohol plant effluent should be treated with lime to a pH of 6 or higher. I have found that the use of additional slaked lime sufficient to bring the alcohol plant effluent to a pH of 8–8.5 at 90° C. will precipitate some loosely combined $SO_2$ groups in the form of calcium sulphite. Such calcium sulphite can be recycled to the original calcium base sulphite pulping operation and any additional removal of the $SO_2$ groups reduces the alkaline requirements for the vanillin reaction by an amount equivalent to the groups so removed. Under such conditions, I have found that the calcium content of the alcohol plant effluent can be increased from 8.2 to 9.4 grams per litre (expressed as calcium oxide).

By addition of more lime the pH can be carried higher, e.g., up to 14.0 grams per litre (expressed as calcium oxide) in the pH range 10.1–10.5 at 90° C. When this is done a portion of the lignin is co-precipitated with the calcium sulphite, but the combined precipitate settles readily to give a clear liquor which can be decanted and such decanted liquor contains a satisfactorily higher calcium ion concentration. To avoid unnecessary loss the total precipitate from the above step can be reslurried in fresh alcohol plant effluent, the quantity of the latter being such as to give a final pH of 7 and the mixture at that pH being sent to a second settler. Under these conditions the remaining undissolved material comprises about 60% calcium sulphite and can be employed in the preparation of cooking acid for calcium base sulphite pulping. The supernatant liquid from the second settler, which may still contain some calcium sulphite fines, may then in turn be sent back to the initial preliming step.

The calcium base alcohol plant effluent adjusted as above to an optimum calcium content and at a pH of not less than 6 is fed downward through the resin bed which, following Step 1, is in its sodium form. When the operation is started the initial effluent from the column is substantially calcium free and can be used directly as the source of lignosulfonic acid material for a vanillin producing process. As the flow through the ion exchange column continues the effluent contains both sodium and calcium ions, i.e., it is equivalent to a mixture of sodium base and calcium base alcohol plant effluents. Such an effluent from the column should be recycled to the column during Step 2 of the following complete cycle, or alternately, it may be sent to a second ion exchange column in which the resin is present in its sodium form.

It will be obvious that the extent to which the calcium content of the lignosulfonic acid feed to the vanillin reactor is replaced with sodium will depend on the extent to which the methods described above to effect maximum exchange are employed. In practice the extent to which these are employed will be determined by the available equipment and by the economics involved.

*Step 3.*—In this step an acid, preferably sulphurous acid, is passed through the ion exchange bed residual from Step 2, the resin being initially in the form of its calcium derivative, and during the course of this step, exchanging its calcium ion for hydrogen ion. The effect of this step is therefore to regenerate the resin to an acid form suitable for its reuse in Step 1 of the next succeeding cycle.

As the flow of sulphurous acid starts through the resin bed some precipitation of calcium sulphite occurs. This may cause some channelling, but if sufficient sulphurous acid is used substantially all the calcium is removed from the resin as calcium bisulphite and the resin is fully converted to the hydrogen form for use in Step 1. If the calcium bisulphite effluent is to be used in connection with the calcium base sulphite pulping process, it is advantageous to treat this effluent with excess sulphur dioxide and recycle the so-treated liquor through the column during its operation in Step 3 of either of the present or some succeeding cycle sufficient to increase the concentration of calcium bisulphite to the level required for use in the sulphite pulping operation.

The following examples of my three-step process will serve to illustrate the invention which, however, is in no may to be considered as limited to the specific conditions noted in these examples.

EXAMPLE 1

A glass column 2" diameter, 10 feet high, was fitted so that solutions could be passed through it in either an upward or downward direction, the rate of flow being controlled by a Sigma pump. The column was filled to a depth of 2 feet with previously unused Amberlite IRC-50 resin in its hydrogen form.

A volume of 17 litres of a vanillin reactor effluent resulting from a process as disclosed by Craig and Logan in Canadian Patent No. 615,553 was fed upward through the resin bed at an initial rate of 600 cc. per minute. It was observed that if the rate of flow of the vanillin reactor effluent was initially too slow, sufficient gas was evolved to lift the resin bed out of the column. Only a small trace of carbon dioxide evolution was apparent at the 600 cc. per minute rates. This rate was gradually reduced to 300 cc. per minute as the number of exchange centres on the resin decreased. After all the above liquor has been introduced into the column the pump was stopped, the resin bed allowed to settle, and the residual liquor in the column drained out to the level of the top of the resin bed. This completed Step 1 as hereinbefore described and it was observed that the quantity of acid required to reduce the pH of the liquor treated in the coulmn to pH 5.5, i.e., to a pH sufficient to convert the vanillin in the liquor from the form of its sodium derivative to the free form was, volume for volume, only 45% of that required to similarly adjust the pH of the same vanillin reactor effluent which had not been passed through the column.

The volume of 20 litres of calcium base alcohol plant effluent was adjusted, using a general all-purpose electrode, with lime to pH 7.5 at 90° C. The so-treated liquor was fed downward through the column at 400 cc. per minute. The first two litres of such alcohol plant effluent were sufficient to replace the liquor from Step 1 still remaining in the column. Approximately 14 litres of liquor were processed before any calcium appeared in the column effluent. This was collected separately and the flow continued through the column until the pH of the effluent dropped to that of the feed, namely, 7.5. That portion of the effluent which contained calcium ion was retained for recycling in the next cycle of sodium to calcium exchange. The flow through the column was stopped and the liquor in the column again drained to the level of the resin bed, thereby completing Step 2 as hereinbefore described.

A solution of calcium bisulphite containing 10.3 grams per litre calcium (expressed as calcium oxide) and 4% uncombined sulphurous acid (expressed as sulphur dioxide) was passed downward through the column as a rate of 660 cc. per minute. The effluent was analyzed from time to time for calcium using a standard versene titration. Approximately 33.5 minutes were required to regenerate the column, this time being taken at the point where the calcium content of the effluent approached the calcium content of the feed. The pump was then stopped, the column drained as before to the resin level and then washed downward with fresh water to remove the residual acid liquor in the resin bed. This washing was required, since in the following operation, namely, Step 1 of the second cycle, in which fresh vanillin reactor effluent is passed upward through the column, lignin would precipitate from this reactor effluent if excess acid in the liquor of the resin bed were not removed. This operation completed Step 3 as hereinbefore described and the resin bed was then in condition for starting another cycle.

Throughout the various steps the size of the resin particles changed appreciably, as is usual in resins of this type. It was noted that after several cycles the resins reached, in the acid form, a swollen equilibrium volume of the order of 50% greater than that of an unused resin as supplied in the acid form by the manufacturer, that is to say, an unused resin loaded to a depth of two feet in the column later typically occupied approximately three feet in the column, both measurements being made in the acid form.

EXAMPLE 2

A second experiment was run similar to Example 1, except that in Step 2 an alcohol plant effluent was used, the calcium content of which (expressed as grams per litre of CaO) had been increased from an initial 8.0 grams to 12.7 grams per litre by a pretreatment comprising adjusting the pH, using a general purpose electrode, with lime to 9.6 at 90° C. with vigorous agitation, allowing the solids residual in such liquor to settle, decanting off the clear liquor and using such clear liquor in the ion exchange column.

In this example 12 litres of the vanillin reactor effluent converted the ion exchange resin from the acid form to the sodium form. In Step 2 analyses of the feed and effluent flows to and from the column indicated that 120 grams of calcium (expressed as CaO) were absorbed by the resin. This is equivalent to 98.5 grams of sodium, while 92 grams of sodium were released to the alcohol plant effluent giving an exchange efficiency of 94%.

EXAMPLE 3

In a three-step cycle, similar to Example 1, the resin in its calcium form was treated with 7% hydrochloric acid at 500 cc. per minute until the pH of the effluent dropped to 1.0. The resin was then in the hydrogen form and was used to recover more sodium from vanillin reactor effluent. The calcium was recovered as calcium chloride by evaporation of the ion exchange effluent.

EXAMPLE 4

A small column containing 10 cc. of Amberlite IRC-50 ion exchange resin was set up with tanks and auxiliaries using a solenoid valve system to operate automatically on the same three-step cycle as described in Example 1. Periodically it was necessary to remove lignin or calcium salts that precipitated in the resin bed due to plugging of the lines at the very low flows. After 950 complete cycles the resin was removed and examined for deterioration. No loss in capacity of the resin on a weight basis occurred.

In carrying out my process on a two-step basis, I proceed as follows:

*Step A.*—This step is the same as Step 1 of the three-step process previously described and to which reference is made for details of procedure.

A significant difference between the two-step and three-step processes, however, lies in the fact that in the latter the recovery of sodium and the reduction of acid consumption during further processing of the vanillin reactor effluent, as hereinbefore described, is limited by the stoichiometric equivalent of calcium in the alcohol plant effluent used in Step 2 of the three-step process. On the contrary, in the two-step process the limitation imposed on the satisfactory application of my invention is the minimum pH to which the liquor in this Step A may be reduced without precipitation of lignin. The use of an ion exchange resin in the two-step process, therefore, permits sodium recoveries and acid savings approaching double those of the three-step process. Thus, for example, in Example 1 a sodium absorption and recovery corresponding to approximately 45% of that in the vanillin reactor effluent was effected, while in a similar procedure using the two-step process as much as 87% equivalent sodium recovery, with corresponding potential acid savings, has been obtained. Accordingly the flow of vanillin reactor effluent can be controlled and adjusted to give a discharge from the column at a pH just sufficiently high to prevent precipitation of lignin. Such a pH will be approximately 7.0.

*Step B.*—In this step an acid, preferably either sulphurous acid or sodium bisulphite or a mixture of both, is passed through the ion exchange resin bed residual from Step A, the resin being initially in the form of its sodium derivative and, during the course of this step, exchanging its sodium ion for hydrogen ion. The effect of this operation is to regenerate the resin in acid form suitable for its reuse in Step A of the next succeeding cycle.

The high solubility of sodium salts makes this operation much more simple than the corresponding Step 3 of the three-step process. The initial effluent from the column contains sodium, predominately as sodium sulphite, and, as the ion exchange proceeds, the proportion of bisulphite in the effluent increases. In the preferred practice I separate the effluent into fractions, the first of which is predominately sodium sulphite and a second larger fraction containing some sodium sulphite, but predominately sodium bisulphite. The latter fraction is then treated with sulphur dioxide gas to convert the sodium sulphite content to sodium bisulphite with perhaps some excess sulphurous acid. The so-treated liquor is then used to strip additional sodium ions from the ion exchange resin. The former fraction containing substantially sodium sulphite is accumulated and may be used in one or more of several different ways as noted hereafter.

At the conclusion of Step B the resin is subjected to a small water wash to remove excess acid from the liquor in which the resin is suspended; otherwise lignin will be precipitated by such acid when vanillin reactor effluent is introduced in Step A of the next following cycle.

The following examples of my two-step process will serve to illustrate this application of my invention which, however, is not to be considered as in any way limited to the specific conditions noted in these examples.

EXAMPLE 5

15 grams of previously unused Amberlite IRC–50 resin were treated with 186 cc. of a vanillin reactor effluent resulting from a process as disclosed by Craig and Logan in Canadian Patent No. 615,553 until a final pH of 7.7 was obtained. The resin was filtered out using a 50 mesh screen and washed with a small amount of water. This completed Step A. The combined filtrate and water wash were analyzed for sodium and it was observed that the quantity of acid required to reduce the pH of the ion exchange liquor to pH 5.5, i.e., a pH sufficient to convert the vanillin in the liquor from the form of its sodium derivative to the free form, was in total only 13% of that required to adjust an initial corresponding volume of the same vanillin reactor effluent which had not been subjected to Step A.

The exhausted resin was then suspended in water and gassed with sulphur dioxide. The aqueous phase was filtered, combined with a water wash of the resin, and analyzed for sodium content, thus completing Step B. In order to convert the sodium sulphite to sodium hydroxide for use in a process for the production of vanillin, the sodium sulphite so formed was causticized with slaked lime until a maximum pH was reached. The suspension was filtered, the cake water washed, and the combined filtrate and water wash analyzed for sodium content, the sodium contents being all based on one liter of the original liquor:

|  | g./l. |
|---|---|
| Na+ in original liquor | 30.53 |
| Na+ in treated liquor | 17.56 |
| Na+ absorbed on resin | 12.96 |
| Na+ recovered as NaHSO₃ | 12.64 |
| Na+ recovered as NaOH | 12.55 |

It will thus be seen that 97% of the sodium absorbed on the resin was recovered in a form which could be recycled back for use in a process for the production of vanillin.

EXAMPLE 6

The same resin bed as in Example 1 was converted to the sodium form by feeding reactor effluent upward through an ion exchange column. The excess reactor effluent was drained to the bed level. The resin bed was washed downward with 1,500 cc. of water and then a solution of 1,200 g. sodium metabisulphite in 8 liters of water gassed to pH 2.9 with sulphur dioxide was passed through the column. A volume of 1,500 cc. of this liquor was required to displace the water in the bed. Subsequent fractions of effluent were collected and analyzed for sulphite and bisulphite content.

| Fraction No. | Volume in cc. | pH | Percent Sodium as Sulphite |
|---|---|---|---|
| 1 | 1,000 | 7.1 | 82.0 |
| 2 | 500 | 6.5 | 54.3 |
| 3 | 500 | 6.3 | 40.7 |
| 4 | 500 | 6.1 | 30.2 |
| 5 | 1,000 | 5.9 | 21.5 |
| 6 | 2,000 | 5.6 | 13.3 |
| 7 | 2,000 | 5.2 | 5.0 |
| 8 | 1,000 | 4.7 | 1.0 |

The final sulphite-bisulphite mixture was displaced from the column with 1,500 cc. of water and the resin was ready for Step A. Fractions 2 to 8 inclusive were combined and gassed to pH 3.0 with sulphur dioxide and used to strip the sodium from the resin in the following cycle. Fraction 1 was used to treat a sample of alcohol plant effluent as follows:

A 100 cc. sample of alcohol plant effluent at 90° C. containing 8 g./l. calcium (expressed as calcium oxide) was treated with 2.0 grams of quick lime which had been slaked in a small amount of water. Calcium lignosulfonate precipitated in the solution. A solution containing 1.4 grams of sodium bisulphite and 3.8 grams of sodium sulphite (corresponding to fraction 1 above) was then added. The lignin dissolved and was replaced by a heavy deposit of calcium sulphite which quickly settled out. The precipitate weighing 6.4 grams was filtered from the liquor and contained 91.5% calcium sulphite by analysis, the remainder being absorbed lignin and calcium sulphate. Titration of the liquor to its original pH with standard acid indicated that 1.81 grams of sodium hydroxide had been formed. This compares with the theoretical amount of 1.83 grams. With the particular alcohol plant effluent used it was necessary to add 0.35 gram of lime in excess of the theoretical 1.65 grams in order to allow for calcium bisulphite therein, the theoretical calcium sulphite precipitate being 6.0 grams compared with actual analysis of 5.9 grams. Thus the calcium base alcohol plant effluent was converted to sodium alcohol plant effluent and additional sodium hydroxide was produced, both of which can be used in a vanillin producing process with a reduction of the chemical requirements for such process.

EXAMPLE 7

A volume of 250 cc. of vanillin reactor effluent (pH 13.0) was passed upward through a bed of 50 cc. of Duolite C-63 (a phosphoric acid type cation exchange resin). The liquor was drained to the resin level and displaced from the resin bed by a downward water wash. The pH of the liquor had fallen 7.4. The resin was then regenerated to the hydrogen form using 500 cc. of a 25% solution of sodium bisulphite containing 1% free sulphur dioxide. In a subsequent treatment the pH of 250 cc. of the same vanillin reactor effluent was again reduced to 7.4.

The sodium recovered from the ion exchange resin, as a mixture of sodium sulphite and bisulphite, can be recycled to a process for the production of vanillin by one of the following ways:

(a) *Sodium base pulping*

One manner of employing the sodium sulphite solution is to use it as make-up for a sodium base pulping operation. In this case it will be used as bisulphite and it is not necessary to fractionate the effluent from the sulphurous acid regeneration to obtain a fraction with a high sulphite content. The waste sulphite liquor or alcohol plant effluent would then return to the vanillin process as sodium base liquor. Further saving of caustic can be obtained by liming the sodium base liquor to precipitate any bisulphite as calcium sulphite. However, if the vanillin operation is integrated with a calcium base pulping operation, other alternative methods of recovery can be considered.

(b) *Causticization with lime*

Both sodium sulphite and sodium bisulphite can be causticized with slaked lime as follows:

$$Na_2SO_3 + Ca(OH)_2 \longrightarrow CaSO_3 \downarrow + 2NaOH$$
$$NaHSO_3 + Ca(OH)_2 \longrightarrow CaSO_3 \downarrow + NaOH + H_2O$$

It is obvious from these reactions why I prefer to recover the sodium as sulphite rather than bisulphite. The sodium hydroxide can be recycled to the vanillin process and the calcium sulphite used as make-up chemical for a calcium base pulping operation.

(c) *Treatment with calcium lignosulfonate*

Calcium lignosulfonate may be precipitated from waste sulphite liquor by the procedure described in U.S. Patent Reissue No. 18,268 and U.S. Patent No. 1,856,558 issued to Howard. If a slurry of calcium lignosulfonate is mixed with an amount of sodium sulphite in slight excess over the equi-molecular equivalent of the total calcium oxide content, then a soluble sodium lignosulfonate and an insoluble calcium sulphite are formed. In the case of sodium bisulphite a similar reaction occurs if slaked lime is also added. The above may be illustrated by the following equations:

Calcium lignosulfonate + $Na_2SO_3$ $\longrightarrow$ sodium lignosulfonate + $CaSO_3 \downarrow$ Calcium lignosulfonate + $2NaHSO_3$ + $2Ca(OH)_2$ $\longrightarrow$ sodium lignosulfonate + $2CaSO_3 \downarrow$ + $2H_2O$ The sodium lignosulfonate can then be sent to a vanillin producing process and requires less caustic or sodium carbonate than the original calcium salt. The calcium sulphite can be used as make-up in a calcium sulphite pulping operation.

(d) *Treatment with calcium base waste sulphite liquor and lime*

When either sodium sulphite or sodium bisulphite plus lime is added to waste sulphite liquor the soluble calcium salts in the liquor react to give a precipitate of insoluble calcium sulphite and a sodium base waste liquor according to the following reactions:

Calcium waste sulfite liquor + $Na_2SO_3$ $\longrightarrow$ sodium waste sulfite liquor + $CaSO_3 \downarrow$ Calcium waste sulfite liquor + $2NaHSO_3$ + $2Ca(OH)_2$ $\longrightarrow$ sodium waste sulfite liquor + $2CaSO_3 \downarrow$ + $2H_2O$ I have also found that if additional sodium sulphite or bisulphite in excess of the equivalent calcium in the waste liquor is available, then they may be causticized simultaneously in the liquor to give caustic by the addition of more lime. Thus it is possible to recycle all the sodium that can be recovered from the reactor effluent without, as in the three-step process, being limited by the calcium content of the liquor. In this way the liquor is not only converted to sodium base liquor, but will also contain extra sodium values as sodium hydroxide which can be employed in a vanillin producing process.

If the waste sulphite liquor or alcohol plant effluent contain calcium bisulphite, then it is also necessary to add additional equivalent lime so that there will be enough lime for the above reactions to go to completion as in the following equation:

$$Ca(HSO_3)_2 + Ca(OH)_2 \rightarrow 2CaSO_3 + 2H_2O$$

This lime will replace the more expensive caustic alkali that would be consumed in a vanillin producing process where the calcium bisulphite is converted to sodium sulphate.

I have described my invention in the examples and by the use of the apparatus mentioned above. It is to be understood, however, that these are given by way of illustration only and are not to be construed as limitations of my invention. Such embodiments of my invention, therefore, as come within the scope and purview of the appended claims are to be considered as part of my invention.

The embodiment of the invention in which an exclusive property or privilege is claimed are defined as follows:

1. A repetitive cyclic process for recovering sodium values from and for a process for producing vanillin from lignosulfonic acid compounds, which comprises: (1) pulping lignocellulose materials utilizing a sodium base sulphite pulping process to produce lignosulfonic acid compounds in the liquor residual from said sulphite pulping process; (2) oxidizing said lignosulfonic acid compounds under alkaline conditions in the presence of sodium hydroxide, said sodium hydroxide being present in solution with said lignosulfonic acid compounds, to produce vanillin in the form of its sodium derivative in the liquor residual from said oxidizing step, said liquor residual from said oxidizing step containing lignin in solution; (3) passing said liquor residual from said oxidizing step through a cation exchange resin having exchange centres selected from at least one of the group consisting of carboxylic and phosphoric acid exchange centres, which resin is further characterized by its ability to be regenerated under atmospheric pressure to its hydrogen form by an acid selected from the group consisting of sulphurous acid, aqueous solutions of sodium bisulphite, and mixtures of same, said liquor residual from said oxidizing step containing lignin in solution and being passed through said resin at a rate which maintains the pH of said liquor higher than that at which lignin precipitates therein to convert said resin to its sodium form; (4) passing an acid selected from the group consisting of sulphurous acid, aqueous solutions of sodium bisulphite, and mixtures of the same through said resin in its sodium form to regenerate said resin to its hydrogen form and to produce a liquor containing sodium sulphite and sodium bisulphite; and (5) recycling said liquor containing sodium sulphite and sodium bisulphite to said sodium base sulphite pulping process.

2. A process according to claim 1 in which said liquor residual from said oxidizing step is passed upwardly through said resin.

3. A repetitive cyclic process for recovering sodium values from and for a process for producing vanillin from lignosulfonic acid compounds, which comprises: (1) pulping lignocellulose materials utilizing a calcium base sulphite pulping process to produce lignosulfonic acid compounds in the liquor residual from said sulphite pulping process; (2) passing said liquor residual from said sulphite pulping process through a cation exchange resin having exchange centres in their sodium form to convert said resin to its calcium form and to convert an equivalent amount of said lignosulfonic acid compounds from the form of their calcium derivative to the form of their sodium derivative, said cation exchange resin in its hydrogen form being characterized by having exchange centres selected from at least one of the group consisting of carboxylic and phosphoric acid exchange centres and further characterized by its ability to be regenerated under atmospheric pressure to its hydrogen form by an acid selected from the group consisting of sulphurous acid and an aqueous solution containing both sulphurous acid and calcium bisulphite; (3) oxidizing said lignosulfonic acid compounds in the form of their sodium derivative under alkaline conditions in the presence of sodium hydroxide, said sodium hydroxide being present in solution with said lignosulfonic acid compounds, to produce vanillin in the form of its sodium derivative in the liquor residual from said oxidizing step, said liquor residual from said oxidizing step containing lignin in solution; (4) passing an acid selected from the group consisting of sulphurous acid and an aqueous solution containing both sulphurous acid and calcium bisulphite through said resin in its calcium form to regenerate said resin to its hydrogen form and to produce a liquor containing calcium bisulphite; (5) passing the liquor residual from said oxidizing step and containing lignin in solution through said resin in its hydrogen form at a rate which maintains the pH of the liquor higher than that at which lignin precipitates therein to convert said resin to its sodium form; and (6) recycling said liquor containing calcium bisulphite to said calcium base sulphite pulping process.

4. A process according to claim 3 in which said liquor residual from said oxidizing step is passed upwardly through said resin.

5. A process according to claim 3 in which said liquor residual from said sulphite pulping process is adjusted to a pH greater than about 6 with lime prior to being passed through said resin.

6. A repetitive cyclic process for recovering sodium values from and for a process for producing vanillin from lignosulfonic acid compounds, which comprises: (1) pulping lignocellulose materials utilizing a calcium base sulphite pulping process to produce lignosulfonic acid compounds in the liquor residual from said sulphite pulping process; (2) passing an acid selected from the group consisting of sulphurous acid, aqueous solutions of sodium bisulphite, and mixtures of the same through a cation exchange resin having exchange centres in their sodium form to regenerate said resin to its hydrogen form and to produce a liquor containing sodium sulphite and sodium bisulphite, said cation exchange resin in its hydrogen form being characterized by having exchange centres selected from at least one of the group consisting of carboxylic and phosphoric acid exchange centres and further characterized by its ability to be regenerated under atmospheric pressure to its hydrogen form by an acid selected from the group consisting of sulphurous acid, aqueous solutions of sodium bisulphite, and mixtures of the same; (3) combining said liquor residual from said sulphite pulping process with said liquor containing sodium sulphite and sodium bisulphite to convert an equivalent amount of said lignosulfonic acid compounds from the form of their calcium derivative to the form of their sodium derivative and to precipitate calcium sulphite; (4) separating said calcium sulphite so precipitated; (5) after the separation of said calcium sulphite, oxidizing said lignosulfonic acid compounds in the form of their sodium derivative under alkaline conditions in the presence in its hydrogen form at a rate which maintains the pH of said liquor higher than that at which lignin precipitates produce vanillin in the form of its sodium derivative in the liquor residual from said oxidizing step, said liquor residual from said oxidizing step containing lignin in solution; (6) passing said liquor residual from said oxidizing step and containing lignin in solution through said resin in its hydrogen form at a rate whch maintains the pH of said liquor higher than that at which lignin precipitates therein to convert said resin to its sodium form; and, (7) recycling said calcium sulphite to said calcium base sulphite pulping process.

7. A process according to claim 6 in which said liquor residual from said oxidizing step is passed upwardly through said resin.

8. A process according to claim 6 in which said liquor residual from said sulphite pulping process and said liquor containing sodium sulphite and sodium bisulphite are not only combined but lime is also added.

9. A process according to claim 6 in which said liquor containing sodium sulphite and sodium bisulphite is separated into a first fraction, the sodium content of which is predominantly sodium sulphite and to a lesser extent sodium bisulphite, and a second fraction, the sodium content of which is predominantly sodium bisulphite and to a lesser extent sodium sulphite, employing said first fraction in step 3, passing sulphur dioxide through said second fraction to convert the sodium sulphite content thereof to sodium bisulphite and employing said second fraction, after said treatment with sulphur dioxide, in a subsequent cycle of step 2 as an acid to regenerate said resin to its hydrogen form.

References Cited by the Examiner
UNITED STATES PATENTS
2,230,641   2/41   Findlay.

DONALL H. SYLVESTER, *Primary Examiner.*
CHARLES B, PARKER, *Examiner.*

UNITED STATES PATENT OFFICE
CERTIFICATE OF CORRECTION

Patent No. 3,197,359　　　　　　　　　　　　　　　　July 27, 1965

Charles Donald Logan

It is hereby certified that error appears in the above numbered patent requiring correction and that the said Letters Patent should read as corrected below.

Column 1, line 50, for "an" read -- and --; column 5, line 60, for "coulmn" read -- column --; column 8, in the table, under the heading "Percent Sodium as Sulphite", line 3 thereof, for "40.⊅" read -- 40.2 --; same table, same column, line 4 thereof, for "30.2" read -- 30.4 --.

Signed and sealed this 8th day of March 1966.

(SEAL)
Attest:

ERNEST W. SWIDER　　　　　　　　　　　　　　EDWARD J. BRENNER
Attesting Officer　　　　　　　　　　　　　　　　Commissioner of Patents